United States Patent
Orvegren et al.

(10) Patent No.: US 11,268,261 B2
(45) Date of Patent: Mar. 8, 2022

(54) POST FOR A CAB OF A VEHICLE

(71) Applicant: Volvo Construction Equipment AB, Eskilstuna (SE)

(72) Inventors: Pierre Orvegren, Inglestad (SE); Rafal Kucyniak, Skarbimierz Osiedle (PL); Tonie Jurgec, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 167 days.

(21) Appl. No.: 16/486,000

(22) PCT Filed: Feb. 14, 2018

(86) PCT No.: PCT/EP2018/053666
§ 371 (c)(1),
(2) Date: Aug. 14, 2019

(87) PCT Pub. No.: WO2018/149870
PCT Pub. Date: Aug. 23, 2018

(65) Prior Publication Data
US 2020/0048864 A1 Feb. 13, 2020

(30) Foreign Application Priority Data
Feb. 15, 2017 (WO) .................. PCT/SE2017/050146

(51) Int. Cl.
*E02F 9/16* (2006.01)
*B60R 21/13* (2006.01)

(52) U.S. Cl.
CPC .............. *E02F 9/163* (2013.01); *B60R 21/13* (2013.01); *B60R 2021/137* (2013.01); *B60Y 2200/415* (2013.01)

(58) Field of Classification Search
CPC ......... B60R 21/11; B60R 21/13; B62D 25/04; B62D 33/06; E02F 9/16; E02F 9/163
(Continued)

(56) References Cited

U.S. PATENT DOCUMENTS 3,785,696 A 1/1974 Moore et al.
3,841,695 A 10/1974 Woodward
(Continued)

FOREIGN PATENT DOCUMENTS

EP 1162117 A1 12/2001
EP 1256509 A2 11/2002
(Continued)

OTHER PUBLICATIONS

International Search Report and Written Opinion of the International Searching Authority, PCT/EP2018/053666, dated May 3, 2018, 14 pages.
(Continued)

*Primary Examiner* — Jason S Daniels
(74) *Attorney, Agent, or Firm* — Sage Patent Group (57) ABSTRACT

A post for a cab of a vehicle includes an elongated tubular element presenting a tubular element cavity extending longitudinally within the post and an elongated reinforcement element extending in the longitudinal direction of the tubular element along a part of the tubular element, and including a base end and a free end. A tapered portion of the reinforcement element includes the free end thereof being located in the tubular element cavity and tapered in the direction from the base end towards the free end. A base portion of the reinforcement element is at least partly located in the tubular element cavity and extends from the tapered portion to the base end. The reinforcement element presents a smooth transition between the tapered portion and the base portion.

27 Claims, 8 Drawing Sheets

(58) Field of Classification Search
USPC .................................. 296/30, 190.03, 193.06
See application file for complete search history.

(56) References Cited

U.S. PATENT DOCUMENTS

| | | | |
|---|---|---|---|
| 4,135,756 A * | 1/1979 | Hausmann | B62D 33/0617 |
| | | | 296/190.03 |
| 4,159,835 A | 7/1979 | Leja et al. | |
| 5,636,867 A | 6/1997 | McNabb et al. | |
| 5,820,199 A | 10/1998 | Camplin et al. | |
| 6,032,980 A | 3/2000 | Rapp et al. | |
| 6,209,949 B1 * | 4/2001 | Sakyo | B62D 21/09 |
| | | | 296/190.08 |
| 2001/0005092 A1 | 6/2001 | Sakyo et al. | |
| 2001/0020797 A1 | 9/2001 | Saeki | |
| 2002/0149232 A1 | 10/2002 | Sakyo et al. | |
| 2010/0072788 A1 | 3/2010 | Tyan et al. | |
| 2011/0057479 A1 | 3/2011 | Namura et al. | |
| 2011/0241384 A1 * | 10/2011 | Mori | B62D 25/04 |
| | | | 296/193.06 |
| 2012/0038186 A1 * | 2/2012 | Takaoka | E02F 9/163 |
| | | | 296/190.03 |
| 2014/0217778 A1 | 8/2014 | Gielda et al. | |

FOREIGN PATENT DOCUMENTS

| | | |
|---|---|---|
| EP | 2196382 A1 | 6/2010 |
| EP | 2631372 A1 | 8/2013 |
| JP | 2000234352 A | 8/2000 |

OTHER PUBLICATIONS

International Search Report and Written Opinion of the International Searching Authority, PCT/SE2017/050146, dated Nov. 14, 2017, 11 pages.

Chinese First Office Action dated Mar. 5, 2021 for Chinese Patent Application No. 201880011230.4, 20 pages (including English translation).

* cited by examiner

POST FOR A CAB OF A VEHICLE

CROSS REFERENCE TO RELATED APPLICATIONS

This application is a 35 U.S.C. § 371 national stage application of PCT International Application No. PCT/EP2018/053666 filed on Feb. 14, 2018, which in turn claims priority to PCT International Application No. PCT/SE2017/050146 filed on Feb. 15, 2017, the disclosures and content of which are incorporated by reference herein in their entirety.

TECHNICAL FIELD

The invention relates to a post for a cab of a vehicle, the post presenting a structure end adapted to be connected to a structure in a lower region of the cab, and a roof end adapted to be connected to a roof of the cab. The invention also relates to a vehicle comprising such a post.

The invention is applicable on vehicles in the form of working machines within the fields of industrial construction machines or construction equipment, in particular wheel loaders. Although the invention will be described with respect to a wheel loader, the invention is not restricted to this particular machine, but may also be used in other working machines such as articulated haulers, excavators and backhoe loaders. The invention can also be applied in heavy-duty vehicles, such as trucks, buses and construction equipment. The invention may also be used in other vehicles such as cars.

BACKGROUND

A vehicle in the form of a working machine, e.g. a wheel loader or an articulated hauler, is usually provided with a bucket, container or other type of implement for digging, carrying and/or transporting a load. For example, a wheel loader has a lift arm unit for raising and lowering an implement, such as a bucket. The lift arm comprises hydraulic cylinders for movement of a load arm and the implement attached to the load arm. Usually a pair of hydraulic cylinders is arranged for raising the load arm and a further hydraulic cylinder is arranged for tilting the implement relative to the load arm. In addition, the working machine is often articulated frame-steered and has a pair of hydraulic cylinders for turning/steering the working machine by pivoting a front section and a rear section of the working machine relative to each other. The hydraulic system generally further comprises at least one hydraulic pump, which is arranged to supply hydraulic power, i.e. hydraulic flow and hydraulic pressure, to the hydraulic cylinders. The hydraulic pump is driven by a power source, such as an internal combustion engine or an electric motor.

For vehicles, including working machines, a number of design measures are known to avoid or minimise injuries to persons in the vehicle in case of an accident. For example, it is desired to design a cab for housing a driver of in a working machine so that the driver is protected. For this, a frame for the cab must be able to absorb energy when undergoing deformation, e.g. at a roll-over incident of the working machine.

US2001005092 describes a driver's cab frame for a working machine, in which hollow pillars are formed outer panels and inner panels bonded to each other. A reinforcement member in the form of a thin plate that is bonded to the outer panel or the inner panel to divide an internal space of each of the pillars. JP2000234352A describes, to increase, in a working machine, the rigidity of a connection position between a pillar section of a cab and a floor board, an L-shaped reinforcing member fixed to the pillar section and the floor board. There is however a desire to further improve vehicle cab structures so as to protect a person inside a cab in the case of an accident.

SUMMARY

An object of the invention is to improve the safety of persons in vehicle driver cabs. Another object is to increase the energy absorption of vehicle cab frame structures.

These objects are achieved by a post according to claim 1. Thus, the invention provides a post for a cab of a vehicle, the post presenting a structure end adapted to be connected to a structure in a lower region of the cab, and a roof end adapted to be connected to a roof of the cab, the post comprising an elongated tubular element presenting a tubular element cavity extending longitudinally within the post, wherein the post further comprises an elongated reinforcement element, the reinforcement element extending longitudinally in the longitudinal direction of the tubular element, along a part of the tubular element, and presenting a base end and a free end, a tapered portion of the reinforcement element including the free end thereof being located in the tubular element cavity and tapered in the direction from the base end towards the free end, a base portion of the reinforcement element being at least partly located in the tubular element cavity and extending from the tapered portion to the base end, the base end of the reinforcement element forming the structure end of the post, or being, compared to the free end, located closer to the structure end of the post, the reinforcement element presenting a smooth transition between the tapered portion and the base portion.

It is understood that the free end is located between the structure end and the roof end of the post. It is further understood that the reinforcement element may be fully or partially located in the tubular element cavity. The tubular element may extend from the structure end to the roof end of the post. In some embodiments, the reinforcement element may protrude from the tubular element and may thereby form the structure end of the post.

It is understood that the structure end of the post may be connectable to the structure. It is understood that the roof end of the post may be connectable to the roof. It is understood that post may to support the roof of the cab. It is understood that when the post is installed, the structure end is below the roof end. The post may be installed so as to be vertical or inclined. The cab may be designed so that a body of an averagely build adult person in the cab extends in any suitable manner within the cab, e.g. mainly within a lower part of the cab interior. The length of the reinforcement element may be e.g. 33-50% of the length of the post. However, the length of the reinforcement element may be of any length in relation to the post, depending design of the cab for which it is intended, e.g. whether the post has one or two reinforcement elements as exemplified below. The ratio of the length of the tapered portion of the reinforcement element and the length of the reinforcement element may be 30-70%, e.g. 40-60%. The free end of the reinforcement element is located between the structure end, adapted to be connected to the structure in the lower region of the cab, and the roof end of the post. The base end of the reinforcement element forms the structure end of the post, or is, compared to the free end, located closer to the structure end of the post. The free end may thereby be located at a distance from the roof end of the post. Thereby, at a deformation of the post in a lateral direction, e.g. due to a roll-over incident of the vehicle, a major part of the deformation may be provided between the free end of the reinforcement element and the roof end. I.e. the reinforcement element may provide for avoiding a large deformation in a region of the post in which the reinforcement element is provided. Since this is a lower region of the post, stiffened by the reinforcement element, the major portion of the deformation may take place above this lower region. Thereby, the risk of the post and other parts of the cab structure interfering with a person in the cab is reduced.

The tubular element may present a substantially constant cross-section. The tubular element cavity may present a substantially constant cross-section. Thereby, the tapered portion of the reinforcement element may be at a distance from an inner surface of the tubular element. This may allow some deformation of the tubular element before interfering with the tapered portion. This deformation may increase the energy absorption of the post in case of an accident, e.g. involving the vehicle overturning or rolling over.

The smooth transition between the tapered portion and the base portion of the reinforcement element may allow for the transition to be void of any corner which may induce a fracture of buckling of the tubular element. Such a fracture or buckling would decrease the energy absorbing capacity of the tubular element. Instead due to said smooth transition, the reinforcement element may work similarly to a forging tool, e.g. like stamping or other coldworking, which allows a "gentle" handling of the tubular element, increasing the deformation and energy absorption capacities of the post.

Thus, the invention provides a gradually decreasing stiffness in the direction of the taper. As a result of the smooth transition between the tapered portion and the base portion of the reinforcement element, the stiffness decrease will be continuous and not stepwise. Thereby, some pre-deformation of the tubular element is allowed before the reinforcement element is fully active in supporting the tubular element. This behaviour is beneficial since a fraction or buckling trigger effect caused by an abrupt stiffness change is avoided.

The reinforcement element preferably presents a convexly curved shape along at least a part of the tapered portion, which part is adjacent to the base portion. The base portion may present a substantially constant cross-section. The base portion may be elongated and extend in parallel with the tubular element. Thereby, a smooth curvature may be provided, whereby a tangent of the tapered portion contour gradually and continuously aligns with the longitudinal direction of post. In advantageous embodiments, the reinforcement element does not present, between the base end and the free end, a radius, with respect to an axis which is transverse to the reinforcement element longitudinal extension, which is below a maximum width of the reinforcement element.

It should be noted that the smooth transition between the tapered portion and the base portion of the reinforcement element may be provided also where the tapered portion presents a linear taper. Thereby, the transition between the tapered portion and the base portion may be curved, preferably with a relatively large radius of curvature.

The reinforcement element preferably presents a side extending straight in the longitudinal direction of the tubular element, the taper of tapered portion being formed by a side, which is opposite to the straight side, gradually being closer to the straight side. The tubular element may present a substantially rectangular cross-section. Thereby, the straight side and the side being gradually closer to the straight side may face opposite internal surfaces of the tubular element. Thereby it is possible to orient the post so that the side being gradually closer to the straight side is facing in a direction which is opposite to that of a presumed direction of a lateral deformation of the post in the case of an accident. Thereby a relatively large energy absorbing deflection of the tubular element may be provided before the tubular element makes contact with the free end of the reinforcement element.

It should be noted that in such embodiments a particularly controlled and energy absorbing deformation may be provided where the side being gradually closer to the straight side is facing in a direction which is opposite to that of a presumed direction of a lateral deformation of the post. However, a controlled and energy absorbing deformation may be provided also in other directions.

It should be noted that the invention may also provide flexible and cost effective solutions. For example, a single reinforcement element design may be compatible to a plurality of tubular element designs for adaptation to a plurality of vehicle designs. Also, the reinforcement element may be hidden in the tubular element so that it does not affect the outer shape of the tubular elements.

Preferably, the reinforcement element is, in a region extending from the free end and along at least 75%, preferably 80%, 85%, 90%, or 95%, of the length of the reinforcement element, not fixed to the tubular element. It is understood that in such embodiments, the free end is not fixed to the tubular element. The reinforcement element is preferably fixed to the tubular element at no place other than at, or in the vicinity of, the base end. The reinforcement element may be fixed to the tubular element within a region extending from the base end, and along 25%, preferably 20%, 15%, 10%, or 5%, of the length of the reinforcement element. That the reinforcement element is fixed to the tubular element in the vicinity of the base end, preferably means that the reinforcement element is fixed to the tubular element in said region extending from the base end. In some embodiments, the reinforcement element is, at the base end, or in a vicinity thereof, welded, bolted, or riveted, to the tubular element. In some embodiments, the reinforcement element is not fixed to the tubular element except via the structure in the lower region of the cab. In further embodiments, the reinforcement element is not fixed to the tubular element except via a frame of the vehicle.

The reinforcement element being, in said region extending from the free end and along at least 75% of the length of the reinforcement element, not fixed to the tubular element, permits, in cases of large deformations, sliding, i.e. relative longitudinal movements, between the tubular element and the reinforcement element. This ensures an energy absorbing behavior of said elements. Connections between said elements, e.g. by means of welds, bolts or rivets, at a distance from the base end, may create local instabilities, due to discrete forces transferred at the connections, which may cause buckling. The risk thereof will be effectively reduced by said embodiments.

Preferably, the base portion extends laterally along a major portion of the tubular element cavity in two orthogonal, lateral directions. The base portion may extend laterally at least 90% of the extension of the tubular element cavity in the two orthogonal directions. Where the tubular element presents a symmetric cross-section, e.g. a rectangular cross-section, the base portion, as seen in a lateral cross-section, may extend laterally over a major portion, e.g. at least 90%, of the lateral extension of the tubular element cavity, both in parallel and perpendicularly to the symmetry plane. In advantageous embodiments, in a lateral cross-section, a gap between all external sides of the base portion and the tubular element does not exceed 4 mm, preferably 3 mm, or 2 mm. For example, said gap may be 1-2 mm. Preferably, where the reinforcement element presents a side extending straight in the longitudinal direction of the tubular element, and the taper of tapered portion is formed by a side, which is opposite to the straight side, gradually being closer to the straight side, a gap between the tubular element and the side, which is opposite to the straight side, may be larger than 4 mm, and a gap between the tubular element and the remaining sides of the tapered portion does not exceed 4 mm, preferably 3 mm, or 2 mm.

Thereby, a relatively tight fit between the reinforcement element and the tubular element may be provided. This will contribute to ensuring a highly energy absorbing capacity of the post.

Advantageously, the post presents, at the tapered portion, a symmetric cross-section, whereby the post presents a symmetry plane with a normal in a lateral direction of the post, and the tapered portion is tapered as viewed along the normal of the symmetry plane. Thereby, the base portion may extend laterally along the symmetry plane, from one end to another end of the tubular element cavity. Thus, the tapered portion may present a symmetric cross-section. The symmetry may provide basically the same amount of support for the tubular element during the deformation thereof on both sides of the symmetry plane. Hence, such embodiments may provide a controlled deformation of the tubular element since the risk of torsional deformation is reduced, in particular where a force creating the deformation is directed substantially in parallel with the symmetry plane. Advantageously, the lateral extension of the reinforcement element along the symmetry plane is at the free end 20-80%, preferably 30-70%, more preferably 40-60% of the lateral extension of the reinforcement element along the symmetry plane at the transition between the tapered portion and the base portion.

The objects are also reached with a post for a cab of a vehicle, the post presenting a structure end adapted to be connected to a structure in a lower region of the cab, and a roof end adapted to be connected to a roof of the cab, the post comprising an elongated tubular element presenting a tubular element cavity extending longitudinally within the post, wherein the post further comprises an elongated reinforcement element, the reinforcement element extending longitudinally in the longitudinal direction of the tubular element, along a part of the tubular element, and presenting a base end and a free end, a tapered portion of the reinforcement element including the free end thereof being located in the tubular element cavity and tapered in the direction from the base end towards the free end, wherein the post presents, at the tapered portion, a symmetric cross-section, the base end of the reinforcement element forming the structure end of the post, or being, compared to the free end, located closer to the structure end of the post, whereby the post presents a symmetry plane with a normal in a lateral direction of the post, and the tapered portion is tapered as viewed along the normal of the symmetry plane.

Advantages of such a symmetric cross-section of the post, including a controlled deformation of the tubular element, have been described above. It is understood that the free end is located between the structure end and the roof end of the post. It is also understood that a base portion of the reinforcement element may be at least partly located in the tubular element cavity and extending from the tapered portion to the base end.

Preferably, the tapered portion extends along the normal of the symmetry plane substantially from one end to another end of a cross-section of the tubular element cavity. The tubular element may present first and second inner surfaces located opposite to each other, wherein the tapered portion of the reinforcement element presents a first part located at the first inner surface of the tubular element, and a second part located at the second inner surface, at least one reinforcement element cavity being formed between the first and second parts. Thereby, the reinforcement element may provide a wide support to the tubular element at a deformation of the latter, while the weight of the reinforcement element may be kept relatively low. More specifically, the first and second parts may support respective lateral ends of a tubular element inner surface, and the reinforcement element cavity formed between the first and second parts contributed to a weight reduction. It should be noted that preferably, the first and second parts are located adjacent to the first and second inner surfaces of the tubular element.

The objects are also reached with a post for a cab of a vehicle, the post presenting a structure end adapted to be connected to a structure in a lower region of the cab, and a roof end adapted to be connected to a roof of the cab, the post comprising an elongated tubular element presenting a tubular element cavity extending longitudinally within the post, wherein the post further comprises an elongated reinforcement element, the reinforcement element extending longitudinally in the longitudinal direction of the tubular element, along a part of the tubular element, and presenting a base end and a free end, a tapered portion of the reinforcement element including the free end thereof being located in the tubular element cavity and tapered in the direction from the base end towards the free end, the base end of the reinforcement element forming the structure end of the post, or being, compared to the free end, located closer to the structure end of the post, wherein the tubular element presents first and second inner surfaces located opposite to each other, wherein the tapered portion of the reinforcement element presents a first part located at the first inner surface of the tubular element, and a second part located at the second inner surface, at least one reinforcement element cavity being formed between the first and second parts.

Advantages of these first and second parts of the reinforcement element, including a weight effectiveness, have been described above. It is understood that the free end is located between the structure end and the roof end of the post. It is understood that a base portion of the reinforcement element may be at least partly located in the tubular element cavity and extending from the tapered portion to the base end. As mentioned, it is understood that the structure end of the post may be connectable to the structure, and the roof end of the post may be connectable to the roof.

Preferably, where the post presents, at the tapered portion, a symmetric cross-section, whereby the post presents a symmetry plane with a normal in a lateral direction of the post, and the tapered portion is tapered as viewed along the normal of the symmetry plane, the first and second parts of the reinforcement element are distributed on opposite sides of the symmetry plane. By such a distribution of the first and second parts, the control of the tubular element deformation may be further secured.

Suitably, the first and second parts are connected to each other by at least one connecting part. The reinforcement element may comprise a core presenting a U-shaped cross-section. Thereby, the "lower" part of the "U" may serve as a connecting part between the first and second parts, formed by the "flanges" of the "U". The U-shaped cross-section may provide for the reinforcement element to be simple and cost effective to manufacture, in additional to being weight effective.

Preferably, the taper of the tapered portion of the reinforcement element is formed by two flanges, formed by the U-shaped cross-section of the core, being gradually shorter towards the free end of the reinforcement element. Thereby, the taper may be provided in a manner that is simple to implement in manufacturing.

The core may be welded to the tubular element at three outer faces formed by the U-shaped cross-section, e.g. at the structure end of the post. Thereby a simple and cost effective manner of assembling the tubular element and the reinforcement element may be provided.

Preferably, the core and the tubular element present wall thicknesses which are substantially the same. For example, the tubular element and the core of the reinforcement element may be made from the same thickness steel sheet. This contributes to reducing the cost of manufacture of the post.

Preferably, the reinforcement element comprises a web extending between two flanges formed by the U-shaped cross-section of the core. Thereby it may be secured that the buckling of the flanges is prevented when the reinforcement element supports the deformed tubular element.

Preferably, where the core presents a core base connecting the two flanges formed by the U-shaped cross-section of the core, the distance between the web and the core base is smaller towards the free end of the reinforcement element than towards the base end of the reinforcement element. Thus, the web may be in slight angle to the longitudinal direction of the post. Thereby, the web may be adapted to the tapered contour of the flanges of the core.

In some embodiments, said reinforcement element is a first reinforcement element, the post further comprising a second elongated reinforcement element, the second reinforcement element extending longitudinally in the longitudinal direction of the tubular element, along a part of the tubular element, and presenting a base end and a free end, the free end of the second reinforcement element being located in the tubular element cavity and between the free end of the first reinforcement element and the roof end of the post, the base end of the second reinforcement element forming the roof end of the post, or being, compared to the free end of the second reinforcement element, located closer to the roof end of the post.

Thereby, the deformation of the tubular element may be controlled to take place mainly between the free ends of the reinforcement elements. In addition, the second reinforcement element may be arranged to provide a further gradually decreasing stiffness of the post, e.g. as described above, such that the energy absorption of the tubular element is further decreased. As stated above, the tubular element may extend from the structure end to the roof end of the post. In alternative embodiments, the second reinforcement element may protrude from the tubular element and may thereby form the roof end of the post. The roof end is preferably connectable to the roof.

The objects are also reached with a post for a cab of a vehicle, the post presenting a structure end adapted to be connected to a structure in a lower region of the cab, and a roof end adapted to be connected to a roof of the cab, the post comprising an elongated tubular element presenting a tubular element cavity extending longitudinally within the post, wherein the post further comprises an elongated first reinforcement element, the first reinforcement element extending longitudinally in the longitudinal direction of the tubular element, along a part of the tubular element, and presenting a base end and a free end, the free end being located in the tubular element cavity and between the structure end and the roof end of the post, the base end of the first reinforcement element forming the structure end of the post, or being, compared to the free end, located closer to the structure end of the post, the post further comprising a second reinforcement element located in the tubular element cavity, the second reinforcement element extending longitudinally in the longitudinal direction of the tubular element, along a part of the tubular element and presenting a base end and a free end, the free end of the second reinforcement element being located in the tubular element cavity and between the free end of the first reinforcement element and the roof end of the post, the base end of the second reinforcement element forming the roof end of the post, or being, compared to the free end of the second reinforcement element, located closer to the roof end of the post.

Advantages of such a dual reinforcement element arrangement has been mentioned above, including the ability to control the deformation of the tubular element to take place mainly between the free ends of the reinforcement elements. It is understood that the first reinforcement element and the second reinforcement element may be fully or partially located in the tubular element cavity.

Preferably, a tapered portion of the first reinforcement element including the free end thereof is located in the tubular element cavity and tapered in the direction from the base end of the first reinforcement element towards the free end of the first reinforcement element. Similarly, a tapered portion of the second reinforcement element including the free end thereof may be located in the tubular element cavity and tapered in the direction from the base end of the second reinforcement element towards the free end of the second reinforcement element. Thereby, a base portion of the second reinforcement element may be at least partly located in the tubular element cavity and may extend from the tapered portion of the second reinforcement element to the base end of the second reinforcement element, the second reinforcement element presenting a smooth transition between the tapered portion and the base portion.

Thereby, similarly to what has been described above, a gradual stiffness reduction of the post in the direction of the taper of the second reinforcement element. Where the first reinforcement element presents as described above a smooth transition between the tapered portion of the first reinforcement element and the base portion of the first reinforcement element, the energy absorption of the post in case of an accident, e.g. involving the vehicle overturning or rolling over, may be further increased.

Preferably the post presents, at the tapered portion of the second reinforcement element, a symmetric cross-section, whereby the post presents a symmetry plane with a normal in a lateral direction of the post, and the tapered portion of the second reinforcement element is tapered as viewed along the normal of the symmetry plane. Similarly to what has been described above, thereby, the base portion of the second reinforcement element may extend laterally along the symmetry plane, from one end to another end of the tubular element cavity. Thus, the tapered portion of the second reinforcement element may present a symmetric cross-section. Thereby, as described above, a controlled deformation of the tubular element may be provided since the risk of torsional deformation is reduced, in particular where a force creating the deformation is directed substantially in parallel with the symmetry plane.

Where the post presents, at the tapered portion of the first reinforcement element, a symmetric cross-section, whereby the post presents a symmetry plane with a normal in a lateral direction of the post, and the tapered portion of the first reinforcement element is tapered as viewed along the normal of the symmetry plane, the symmetry plane at the tapered portion of the first reinforcement element and the symmetry plane at the tapered portion of the second reinforcement element may be substantially parallel, the first and the second reinforcement element may be oriented so as to be mirrored as seen along the normal of any of the symmetry planes.

As exemplified below, the mirroring of the reinforcement elements may be provided by the second reinforcement element being turned in relation to the first reinforcement element 180° around a vertical axis. Thereby a convexly curved shape along the tapered portion of the first reinforcement element and a convexly curved shape along the tapered portion of the second reinforcement element are oriented in opposite directions. Thereby, the tapered portions of the reinforcement elements may present substantially identical geometries. However, in some embodiments, the tapered portions of the reinforcement elements may present substantially dissimilar geometries.

The mirrored arrangement of the the reinforcement elements makes it possible to provide a beneficial s-shaped deformation of the post. Thereby, buckling of the tubular element may be avoided, and instead a shear failure of the tubular element may be provided. Such a deformation may be particularly energy absorbing during an accident, e.g. involving a roll over incident of the vehicle.

Preferably, the free ends are provided at a distance from each other. Thereby, said advantageous s-shaped deformation may be secured.

The objects are also reached with a structural frame for a cab of a vehicle according to some embodiments. Preferably, the tapered portion of the reinforcement element of the post is located above the structure in the lower region of the cab.

The objects are also reached with a vehicle according to some embodiments. Preferably, where the post of the vehicle presents, at the tapered portion of the reinforcement element, a symmetric cross-section, whereby the post presents a symmetry plane with a normal in a lateral direction of the post, and the tapered portion of the reinforcement element is tapered as viewed along the normal of the symmetry plane, the symmetry plane is oriented so as to extend in parallel with a deformation direction which is a direction of a presumed major deformation in case of a roll-over incident of the vehicle. The deformation direction suitably has a component in a lateral direction of the post. Such embodiments may provide a controlled deformation of the tubular element as the risk of torsional deformation is reduced since the deformation is directed substantially in parallel with the symmetry plane.

The deformation direction may be parallel to a lateral direction of the vehicle. Thereby where the presumed major deformation in case of a roll-over incident of the vehicle is in the lateral direction of the vehicle the energy absorbing capacity of the post may be optimized by the symmetry plane being oriented so as to extend in parallel with the lateral direction of the vehicle. Alternatively, the deformation direction may be parallel to a longitudinal direction of the vehicle. Thereby where the presumed major deformation in case of a roll-over incident of the vehicle is in the longitudinal direction of the vehicle the energy absorbing capacity of the post may be optimized by the symmetry plane being oriented so as to extend in parallel with the longitudinal direction of the vehicle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
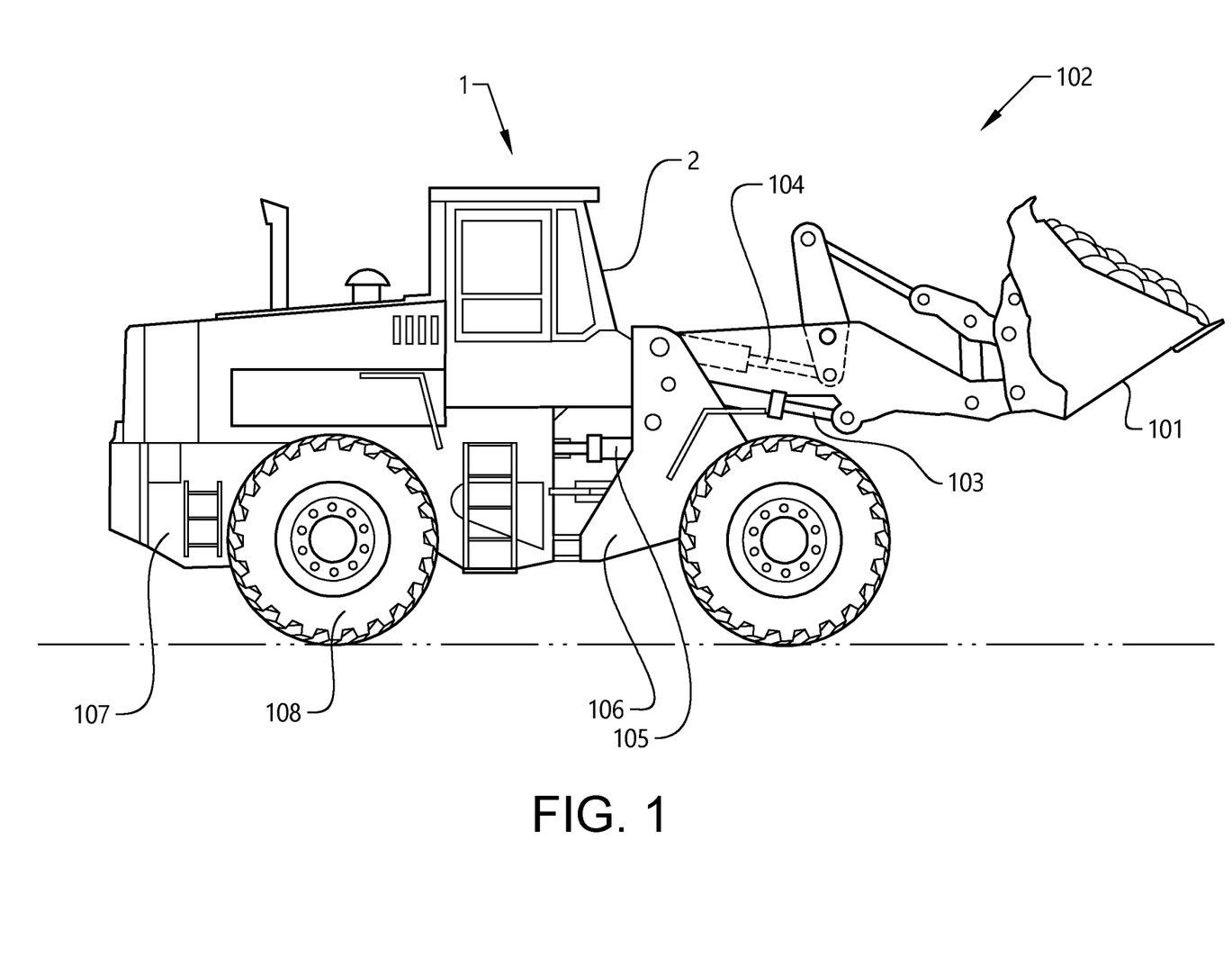
FIG. 1 is a side view of vehicle in the form of a wheel loader.

FIG. 1 is an illustration of a vehicle in the form of a working machine 1, more specifically in the form of a wheel loader. The wheel loader is an example of a working machine where a post according to a suitable embodiment of the invention can be applied.

The wheel loader 1 has an implement 101. The term "implement" is intended to comprise any kind of tool controlled by hydraulics, such as a bucket, a fork or a gripping tool. The implement 101 illustrated in FIG. 1 is a bucket 101 which is arranged on a load arm 102 for lifting and lowering the bucket 101. Further the bucket can be tilted relative to the load arm. In the example illustrated in FIG. 1, a hydraulic system of the wheel loader 1 comprises two hydraulic cylinders 103 for the operation of the load arm 102 and one hydraulic cylinder 104 for tilting the bucket 101 relative to the load arm.

The hydraulic system of the wheel loader further comprises two hydraulic cylinders 105, steering cylinders, arranged on opposite sides of the wheel loader 1 for turning the wheel loader by means of relative movement of a front body part 106 and a rear body part 107. In other words: The wheel loader 1 is articulated and frame steered by means of the steering cylinders 105. There is a pivot joint connecting the front body part 106 and the rear body part 107 of the wheel loader 1 such that these parts are pivotally connected to each other for pivoting about a substantially vertical axis.

The wheel loader 1 is provided with four wheels 108, i.e. two on each body part 106, 107. The wheel loader 1 has a propulsion system with an internal combustion engine (not shown), arranged to drive the wheels 108 via a drivetrain including a transmission.

The wheel loader further comprises a cab 2. The cab 2 is arranged to accommodate a driver of the wheel loader 1, and various control devices for the driver's control of the wheel loader.

Figure 2:
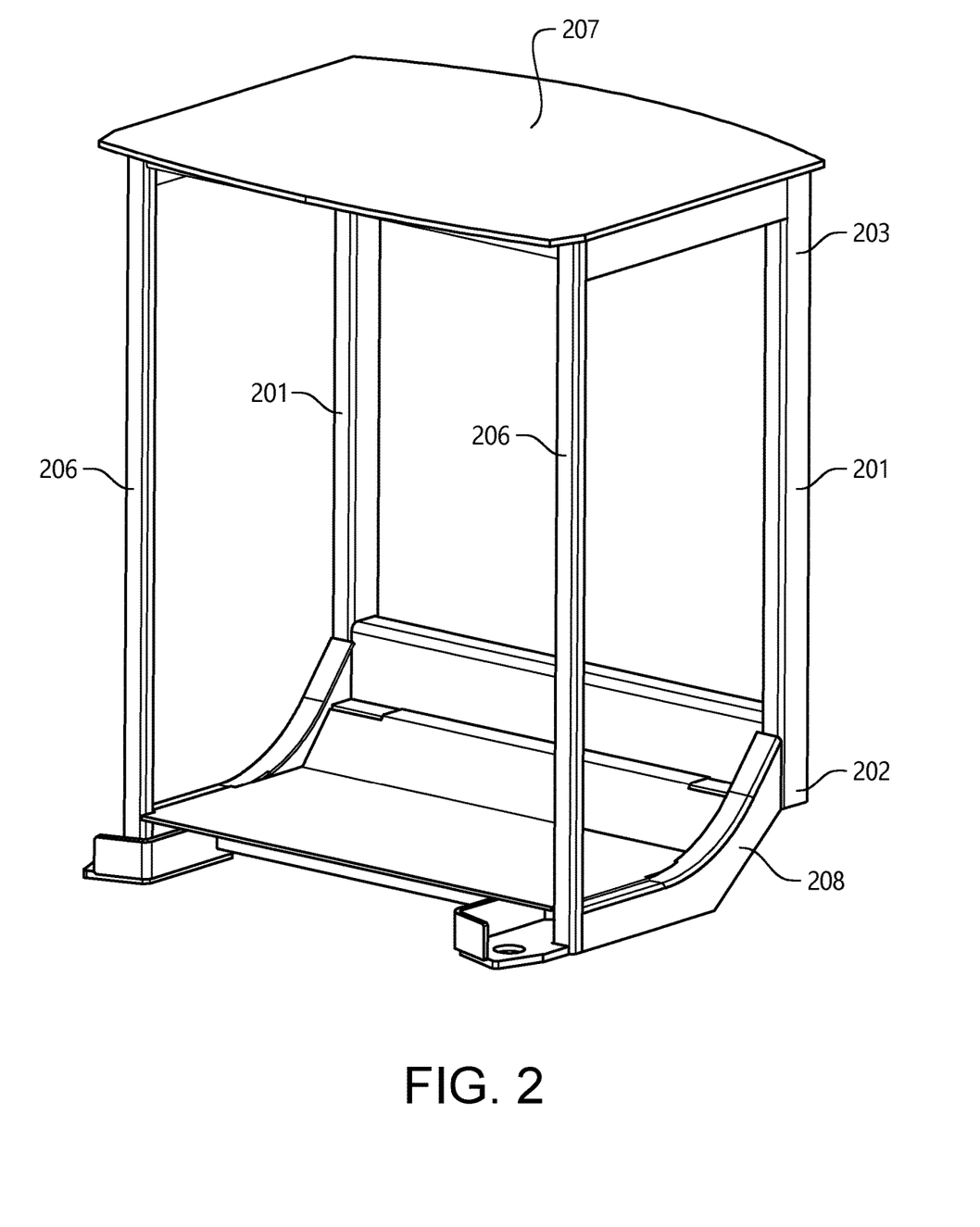
FIG. 2 shows a perspective view of a structural frame for a cab of the vehicle in FIG. 1.

Reference is made to FIG. 2 showing a structural frame for the cab 2. The cab frame comprises a roof 207 supported by two posts 201 arranged, in relation to a forward travel direction of the vehicle 1, in a rear part of the cab 2. Two pillars 206 in the forward part of the cab 2 provides additional support for the roof 207. The posts 201 and the pillars 206 extend substantially vertically. The posts 201 and the pillars 206 are mounted at their lower ends to a structure 208 in a lower region of the cab 2. The structure 208 is fixed to a frame of the rear body part 107 (FIG. 1).

Figure 3:
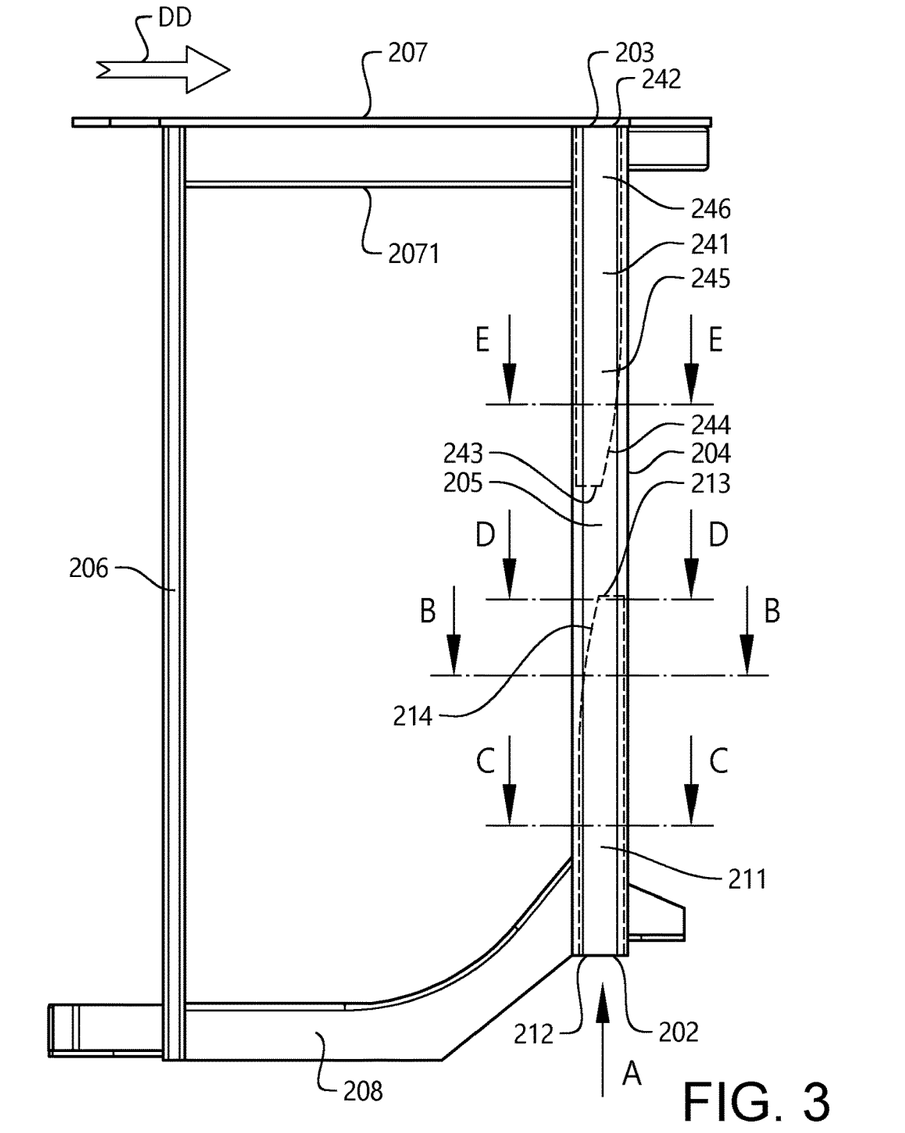
FIG. 3 shows a side view of the structural frame in FIG. 2, with some parts, hidden by a further part, indicated with broken lines.
Figure 4:
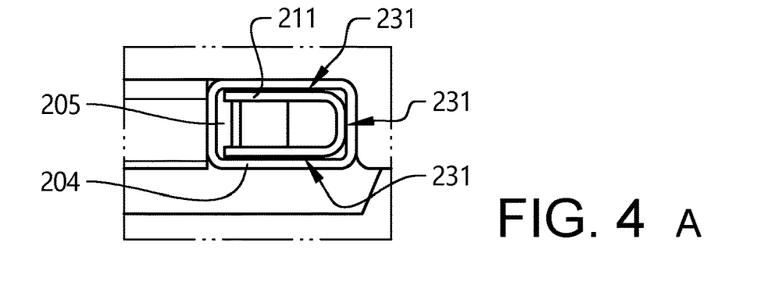
FIG. 4 shows a detail as indicated by the arrow A in FIG. 3.

Reference is made also to FIG. 3 and FIG. 4. The respective lower end at which each post 201 is fixed to the structure 208 is herein also referred to a structure end 202. The respective upper end at which each post 201 is fixed to the roof 207 is herein also referred to a roof end 203.

FIG. 3 shows the left post 201 in relation to the intended forward travel direction of the vehicle. The right post 201 seen in FIG. 2 is identical to the left post 201. The post 201 comprises an elongated and straight tubular element 204 presenting a tubular element cavity 205 extending longitudinally within the post. The tubular element cavity 205 the tubular element 204 presents a substantially rectangular cross-section as can be seen in FIG. 4. The cross-section of the tubular element cavity 205 is constant along the tubular element 204.

The post further comprises an elongated first reinforcement element 211 located in the tubular element cavity 205, The post also comprises an elongated second reinforcement element 241 described further below.

The first reinforcement element 211 extends longitudinally in the longitudinal direction of the tubular element 204, along a part of the tubular element. The first reinforcement element 211 presents a base end 212 and a free end 213. The free end is located between the structure end 202 and the roof end 203 of the post 201. The base end 212 of the first reinforcement element 211 is located at the structure end 202 of the post and forms together with the tubular element the structure end of the post.

At the structure end 202 the tubular element is connected to the structure 208 by welding at a portion of the exterior of the tubular element. The first reinforcement element 211 is fixed to the tubular element. More specifically, at the structure end 202, the first reinforcement element 211 is welded to the tubular element 204 at three outer faces 231 of the first reinforcement element, as indicated in FIG. 4. Further, the first reinforcement element 211 is, in a region extending from the free end 213 and to said welded fixations, not fixed to the tubular element 204.

Alternatively the post may be fixed to the structure 208 by any other suitable fastening method, such as bolting or riveting. In some embodiments, e.g. where the first reinforcement element 211 protrudes from the tubular element and forms the structure end 202 of the post 201, the first reinforcement element may be fastened directly to the structure 208.

Figure 5:
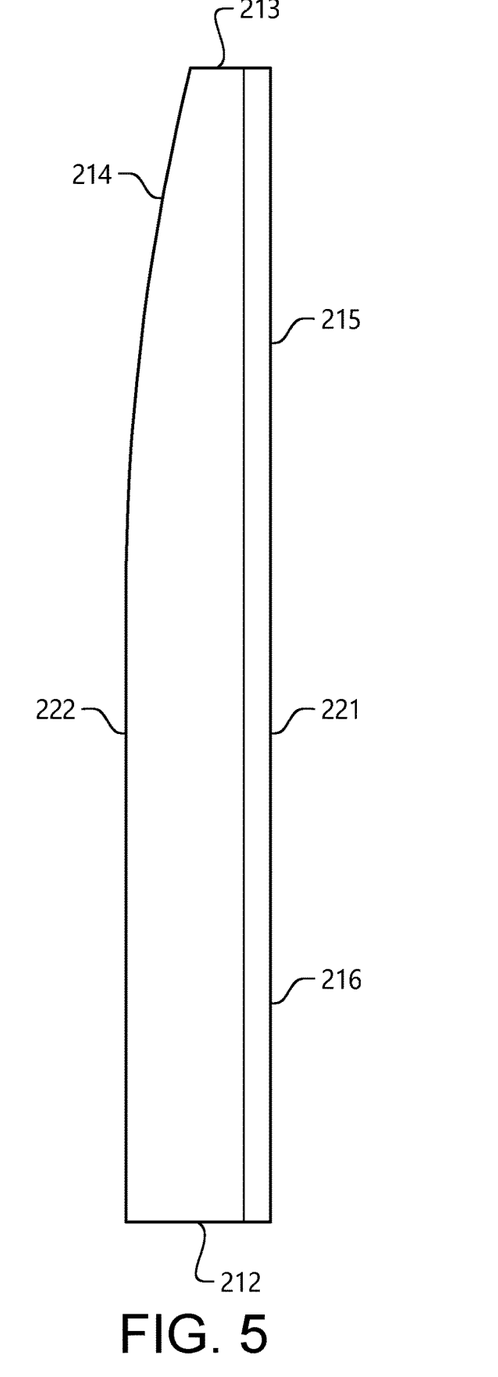
FIG. 5 shows a side view of a reinforcement element in the structural frame in FIG. 3.

Reference is made also to FIG. 5. A tapered portion 215 of the first reinforcement element 211 including the free end 213 thereof is tapered in the direction from the base end 212 towards the free end 213. A base portion 216 of the first reinforcement element extends from the tapered portion 215 to the base end 212. In this embodiment, the tapered portion extends over approximately half the length of the first reinforcement element 211.

The first reinforcement element presenting a smooth transition between the tapered portion 215 and the base portion 216. The first reinforcement element 211 presents a convexly curved shape 214 along the tapered portion. The base portion 216 presents a substantially constant cross-section.

The first reinforcement element 211 presents a first side 221 extending straight in the longitudinal direction of the first reinforcement element. The first side 221 extends in parallel with the tubular element 204. The taper of tapered portion 215 is formed by a second side 222, which is opposite to the straight first side 221, gradually being closer to the first side. At the base portion 216 the second side 222 is straight and parallel to the first side 221. In this example the curvature of the convexly curved shape 214 along the tapered portion is constant. As can be seen in FIG. 5, the tangent of the curved part of the second side 222 aligns, with a decreasing distance to the straight part of the second side 222, gradually and without any discontinuity the straight part of the second side 222.

Figure 6:
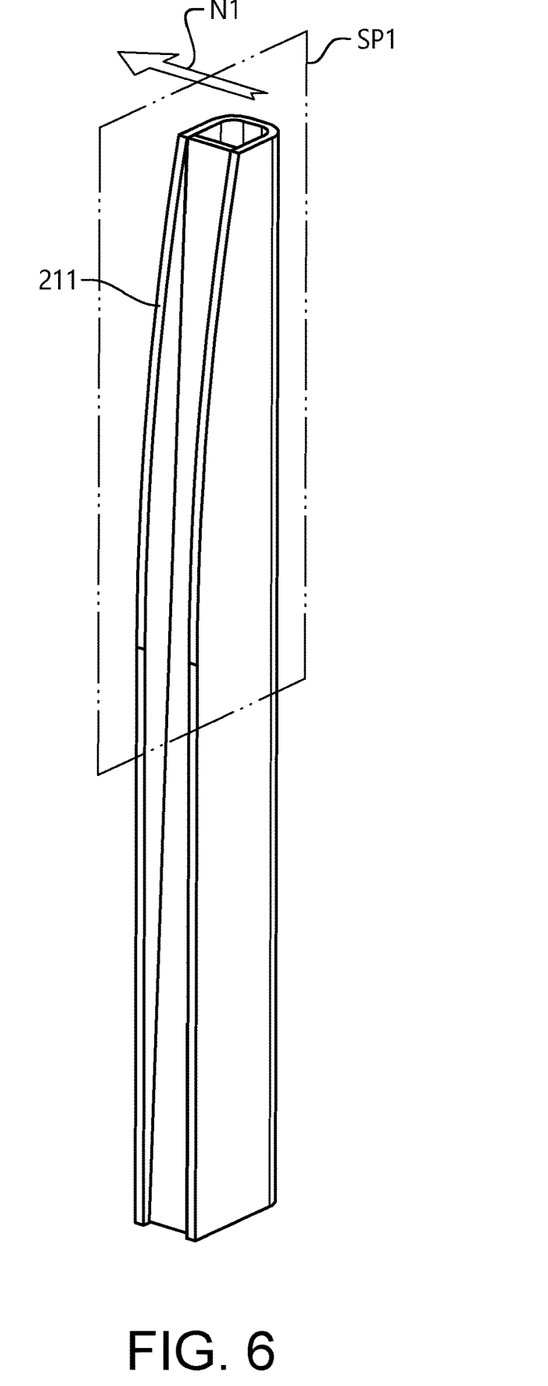
FIG. 6 shows a perspective view of the reinforcement element in FIG. 5.
Figure 7:
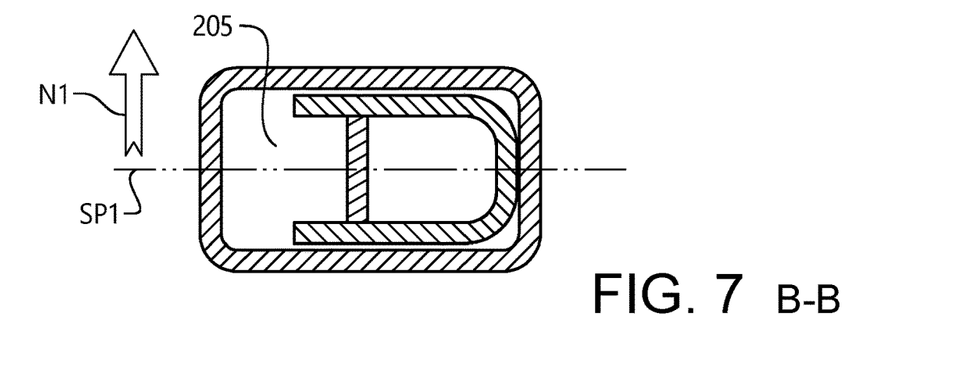
FIG. 7 shows a cross-section as indicated by the arrows B-B in FIG. 3.

Reference is made also to FIG. 6 and FIG. 7. The post presents a symmetric cross-section, whereby the post presents a first symmetry plane SP1 with a first normal N1 in a lateral direction of the post. Thus, the tapered portion 215 of the first reinforcement element 211 presents a symmetric cross-section, and is tapered as viewed along the first normal N1 of the first symmetry plane SP1. The first normal N1 is indicated in FIG. 6 and FIG. 7 with arrows. As can be seen e.g. in FIG. 7, the tapered portion 215 extends along the first normal N1 of the first symmetry plane SP1 substantially from one end to another end of a cross-section of the tubular element cavity 205.

Figure 8:
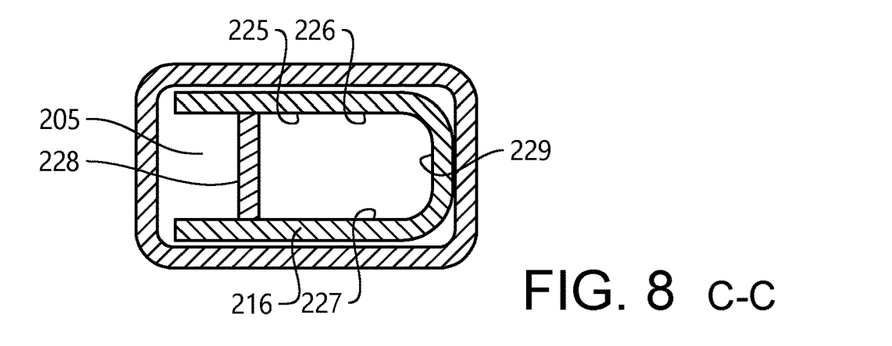
FIG. 8 shows a cross-section as indicated by the arrows C-C in FIG. 3.
Figure 9:
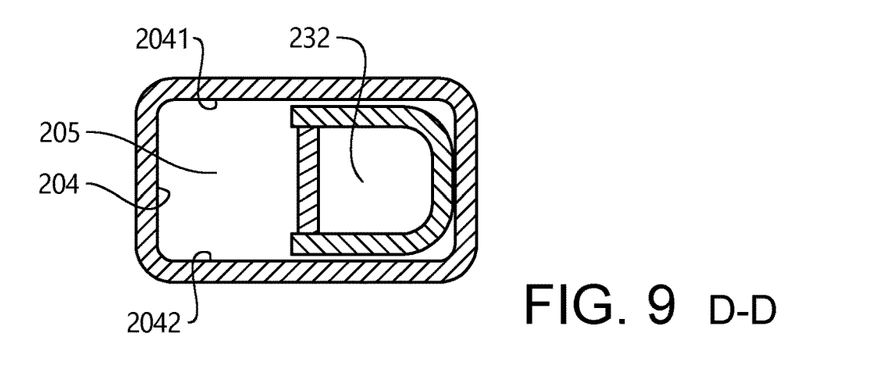
FIG. 9 shows a cross-section as indicated by the arrows D-D in FIG. 3.

Reference is made also to FIG. 8 and FIG. 9. As understood from FIG. 8, the base portion 216 extends laterally along the first symmetry plane SP1, from one end to another end of the tubular element cavity 205. As can be seen in FIG. 8, the base portion 216, extends laterally over a major portion of the lateral extension of the tubular element cavity 205, both along the long side of the rectangular cross-section, and along the short side thereof. Preferably, the gap between all external sides of the base portion and the tubular element does not exceed 4 mm.

As indicated in FIG. 9, the tubular element 204 presents, by its rectangular cross-section, first and second inner surfaces 2041, 2042 located opposite to each other. As indicated in FIG. 8, the first reinforcement element presents a first part 226 located at, or adjacent to, the first inner surface 2041 of the tubular element, and a second part 227 located at, or adjacent to, the second inner surface 2042. The first and second parts 226, 227 of the first reinforcement element 211 are distributed on opposite sides of the first symmetry plane SP1. A reinforcement element cavity 232 is formed between the first and second parts 226, 227. The first and second parts 226, 227 are connected to each other by two connecting parts 228, 229.

More specifically, the first reinforcement element 211 comprises a core 225 presenting a U-shaped cross-section. Thereby, said first and second parts 226, 227 are formed by the flanges formed by the U-shaped cross-section. The taper of the tapered portion 215 of the first reinforcement element 211 is formed by the two flanges 226, 227 being gradually shorter towards the free end 213 of the first reinforcement element 211. As suggested above, at the structure end 202 of the post 201, the core 225 is welded to the tubular element 204 at three outer faces 231 formed by the U-shaped cross-section, (FIG. 4).

In this embodiment, the core 225 and the tubular element 204 present wall thicknesses which are substantially the same. The core 225 and the tubular element 204 may be made of any suitable material, e.g. steel. The core 225 and the tubular element 204 may be made from metal sheets of a suitable thickness, for example 3-10 mm, e.g. 6 mm.

One of said connecting parts 228, 229 is formed by a core base 229 presented by the core 225. The core base 229 connects the two flanges 226, 227 formed by the U-shaped cross-section of the core 225. The other of said connecting parts 228, 229 is formed by a web 228 extending between the flanges 226, 227. In this example, the web extends from the free end 213 of the first reinforcement element 211 to the base end 212 of the first reinforcement element. It should be noted that the web is in a slight angle, so that the distance between the web 228 and the core base 229 is smaller towards the free end 213 than towards the base end 212.

Reference is made to FIG. 9. Preferably, the gap between the outer sides of the U-shaped cross-section of the tapered portion of the reinforcement element and the tubular element 204 does not exceed 4 mm.

The second reinforcement element 241 shown in FIG. 3 is largely similar to the first reinforcement element 211, as clarified in the following presentation. The second reinforcement element 241 is located in the tubular element cavity 205 and presents a base end 242 and a free end 243. The free end of the second reinforcement element 241 is located between the free end 213 of the first reinforcement element and the roof end 203 of the post 201. The free ends 213, 243 are provided at a distance from each other. The base end 242 of the second reinforcement element 241 forming together with the tubular element 204 the roof end 203 of the post.

Similarly to the first reinforcement element 211, a tapered portion 245 of the second reinforcement element 241 including the free end 243 thereof is tapered in the direction from the base end 242 of the second reinforcement element towards the free end 243 of the second reinforcement element. A base portion 246 of the second reinforcement element 241 extends from the tapered portion 245 of the second reinforcement element 241 to the base end 242 of the second reinforcement element 241, and the second reinforcement element 241 presenting a smooth transition between the tapered portion 245 and the base portion 246.

In this embodiment, the tubular element 204 extends from the structure end 202 to the roof end 203 of the post 201. In alternative embodiments, one of or both of the reinforcement elements 211, 241 may protrude from respective ends of the tubular element 204 and may thereby form the structure end 202 and/or the roof end 203, respectively.

As can be seen in FIG. 3, at the roof end 203, the tubular element is connected to a horizontal beam 2071 of the roof 207 by welding at a portion of the exterior of the tubular element 204. Alternatively the post may be fixed to the roof 207 by any other suitable fastening method, such as bolting or riveting. In some embodiments, e.g. where the second reinforcement element 241 protrudes from the tubular element and forms the roof end 202 of the post 201, the second reinforcement element 241 may be fastened directly to the roof.

Figure 10:
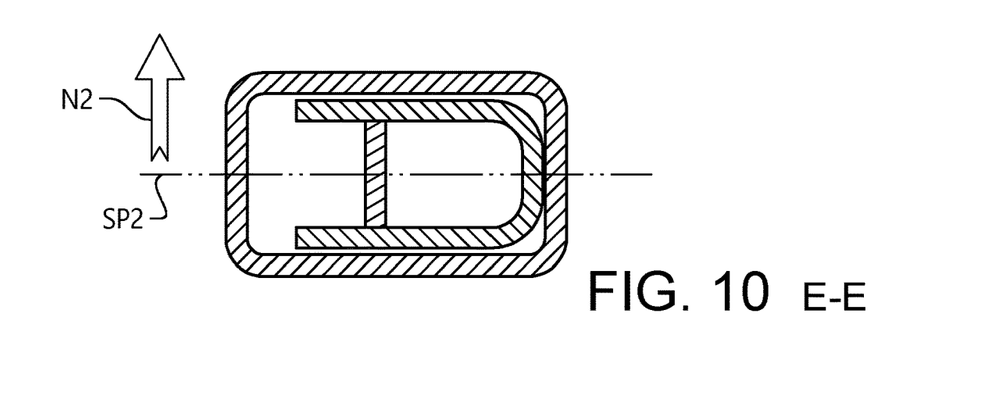
FIG. 10 shows a cross-section as indicated by the arrows E-E in FIG. 3.

Reference is made also to FIG. 10. Similarly to what has been described above regarding the first reinforcement element 211, the post presents, at the tapered portion 245 of the second reinforcement element 241, a symmetric cross-section, whereby the post presents a second symmetry plane SP2 with a second normal N2 in a lateral direction of the post.

The tapered portion 245 of the second reinforcement element 241 is tapered as viewed along the second normal N2 of the symmetry plane.

The symmetry plane SP1 at the tapered portion 215 of the first reinforcement element 211 and the symmetry plane SP2 at the tapered portion 245 of the second reinforcement element 241 are substantially parallel. Thereby, the first and the second reinforcement element 211, 241 are oriented so as to be mirrored as seen along the normal N1, N2 of any of the symmetry planes SP1, SP2. As can be seen in FIG. 3, in this embodiment, the second reinforcement element 241 is turned in relation to the first reinforcement element 211 180° around a vertical axis. Thereby the convexly curved shape 214 along the tapered portion 215 of the first reinforcement element 211 and the convexly curved shape 244 along the tapered portion 245 of the second reinforcement element 241 are oriented in opposite directions.

As indicated in FIG. 3, both symmetry planes SP1, SP2 are oriented so as to extend in parallel with a deformation direction DD which is a direction of a presumed major deformation in case of a roll-over incident of the vehicle. In this example, the deformation direction DD is parallel to a longitudinal direction of the vehicle, i.e. a direction of straight travelling of the vehicle.

In alternative embodiments, the deformation direction may be parallel to a lateral direction of the vehicle. Thereby, the normal N1, N2 of the symmetry planes SP1, SP2 described above are preferably oriented in the longitudinal direction of the vehicle.

Figure 11:
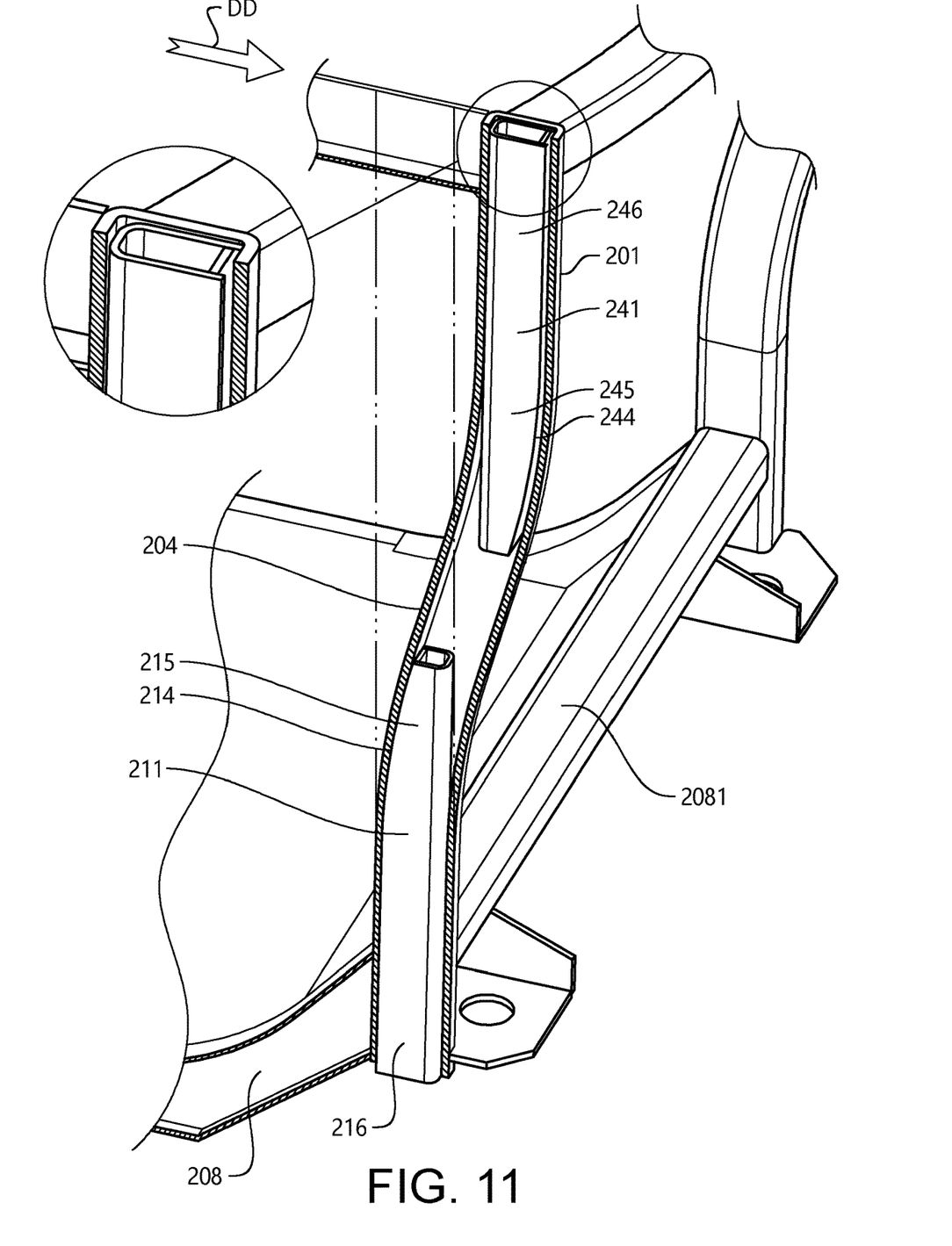
FIG. 11 shows a perspective view of a part of the structural frame in FIG. 3 when deformed.

Reference is made to FIG. 11, illustrating a part of the cab frame structure described above with reference to FIG. 1-FIG. 10, when subjected to a force in the deformation direction DD. It should be noted that the tapered portion 215 of the first reinforcement element 211 of the posts 204 are located above the structure 208 in the lower region of the cab, including a horizontal beam 2081 of the structure 208. As can be seen in FIG. 11, some deformation of the tubular element 204 has been allowed before interfering with the tapered portions 215, 245 of the reinforcement elements 211, 241. This deformation increases the energy absorption of the post. Further, the smooth transitions between the tapered portions 215, 245 and the base portions 216, 246 of the reinforcement element allows for the transition to be void of any corner which may induce a fracture of buckling of the tubular element. Thereby, said smooth transition and the convexly curved shapes 214, 244 of the tapered portions work similarly to a forging tool, increasing the deformation and energy absorption capacities of the post. The mirrored arrangement of the the reinforcement elements 211, 241 provides an s-shaped deformation of the post 201. Thus, buckling of the tubular element 204 is avoided, and instead a shear failure of the tubular element is provided, providing a particularly energy absorbing process.

Figure 12:
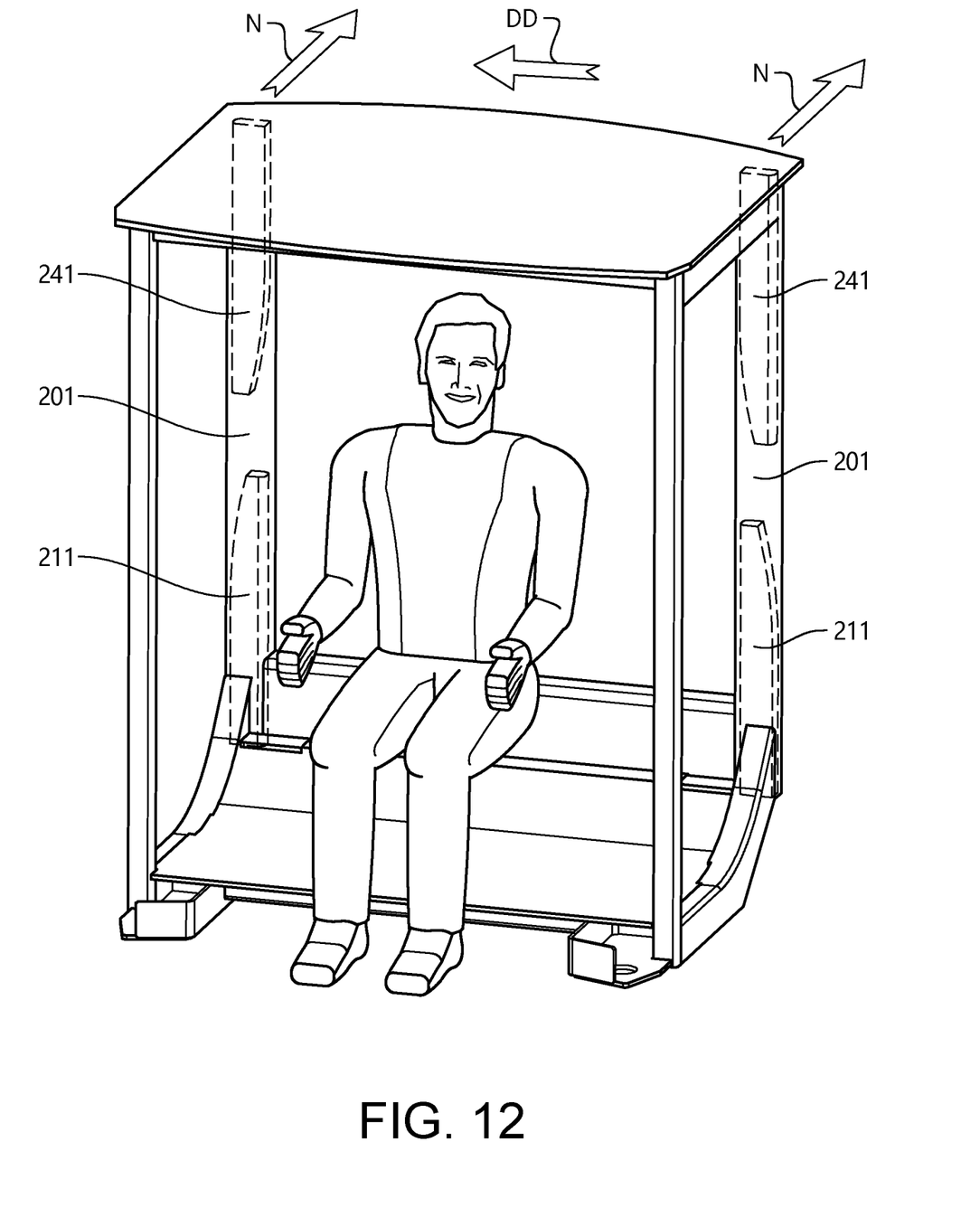
FIG. 12 shows a perspective view of a structural frame, with posts according to an alternative embodiment of the invention.

Reference is made to FIG. 12. In the embodiment described with reference to FIG. 1-FIG. 11, the deformation direction DD is parallel to the longitudinal direction of the vehicle. Alternatively, as illustrated in FIG. 12 the deformation direction may be parallel to a lateral direction of the vehicle.

The embodiment in FIG. 12 is similar to the embodiment described with reference to FIG. 1-FIG. 11. For example, the posts 201 present parallel symmetry planes with normals N in parallel lateral directions of the posts 201, and the tapered portions of the reinforcement elements 211, 241 are tapered as viewed along the normals N of the symmetry planes. Also, the reinforcement elements 211, 241 in each post 201 are oriented so as to be mirrored as seen along the normals N. In addition, the posts 201 are oriented so as to be mirrored in relation to each other. I.e. one of the posts 201 is turned 180° around a vertical axis in relation to the other post 201. In each post, the convexly curved shape of the lower, first reinforcement member 211 faces outwards from the cab. In each post, the convexly curved shape of the upper, second reinforcement member 211 faces inwards.

Differing from the embodiment described with reference to FIG. 1-FIG. 11 the symmetry planes are oriented so as to extend in parallel with the lateral direction of the vehicle. I.e. the normal N are directed in the longitudinal direction of the vehicle. Thereby the cab frame structure is particularly suited to absorb energy from deformations in the lateral direction of the vehicle.

Figure 13:
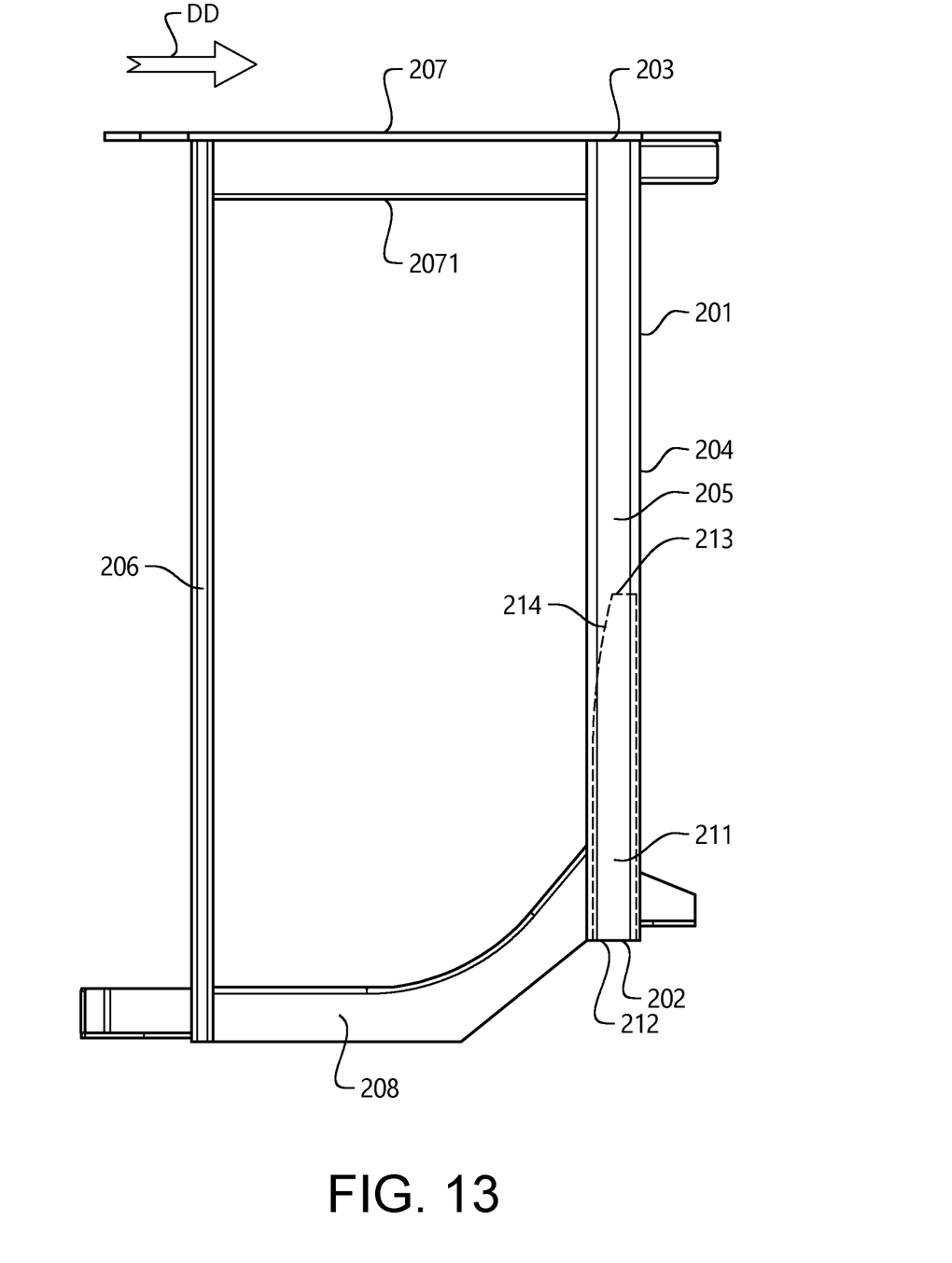
FIG. 13 shows a side view of a structural frame with posts according to a further embodiment of the invention.

FIG. 13 shows a portion of a cab frame structure with a post 201 according to another embodiment of the invention. The embodiment in FIG. 13 is similar to the one described with reference to FIG. 1-FIG. 11. However, differing from the posts in the embodiment described with reference to FIG. 1-FIG. 11, the post 201 shown in FIG. 1 has only one reinforcement element 211, corresponding to what is referred to as the first reinforcement element 211 in the description above with reference to FIG. 1-FIG. 11.

It is understood that a large number of alternatives to the embodiments described may be provided. For example, the web 228 of the reinforcement element(s) 211, 241 may extend only along a portion of the reinforcement element(s) 211, 241, for example only along the tapered portions 215, 245 of the reinforcement element(s) 211, 241. In some embodiments, where the reinforcement element comprises a core 225 presenting a U-shaped cross-section, the reinforcement element may be provided without a web 228.

The reinforcement element(s) 211, 241 may present cross-sections which differ from the ones described above. In some embodiments, cross-sections of the reinforcement element(s) may be H-shaped. Thereby, two flanges, similar to the flanges 226, 227 in the example described above with reference to FIG. 8, may be connected by a single connecting part, or web, in a central part of the cross-section. Similarly to the web 228 in the example described above with reference to FIG. 5, FIG. 6 and FIG. 8, a web in a reinforcement element with an H-shaped cross-section may be in a slight angle, so that the distance between the web 228 and a side 221 extending straight in the longitudinal direction of the reinforcement element is smaller towards the free end 213 than towards the base end 212 of the reinforcement element.

As stated, the invention is not only applicable to working machines, but can be used for other vehicle types such as trucks, buses and cars. It is understood that in some embodiments, the cab may be arranged to be occupied by a plurality of persons. These persons may include, in addition to a vehicle driver, one or more passengers.

It is to be understood that the present invention is not limited to the embodiments described above and illustrated in the drawings; rather, the skilled person will recognize that many changes and modifications may be made within the scope of the appended claims.

The invention claimed is:

1. A post for a cab of a vehicle, comprising:
a structure end adapted to be connected to a structure in a lower region of the cab,
a roof end adapted to be connected to a roof of the cab,
an elongated tubular element comprising a tubular element cavity extending longitudinally within the post, and
an elongated reinforcement element extending longitudinally in the longitudinal direction of the tubular element, along a part of the tubular element, and comprising a base end and a free end,
a tapered portion of the reinforcement element including the free end thereof being located in the tubular element cavity and tapered in the direction from the base end towards the free end,
a base portion of the reinforcement element being at least partly located in the tubular element cavity and extending from the tapered portion to the base end,
the base end of the reinforcement element being, compared to the free end, located closer to the structure end of the post,
the reinforcement element comprising a smooth transition for voiding corners between the tapered portion and the base portion;
wherein the reinforcement element comprises a first side extending straight in the longitudinal direction of the tubular element and a second side opposite the first side, the first side and the second side of the reinforcement element contacting respective inner surfaces of the tubular element, and a taper of the tapered portion being formed by the second side gradually becoming closer to the straight side in the tapered portion of the reinforcement element.

2. The post according to claim 1, wherein the tubular element cavity comprises a substantially constant cross-section.

3. The post according to claim 2, wherein the base portion comprises a substantially constant cross-section.

4. The post according to claim 3, wherein the reinforcement element comprises a convexly curved shape along at least a part of the tapered portion, which part is adjacent to the base portion.

5. The post according to claim 1, wherein the reinforcement element is, in a region extending from the free end and along at least 75% of the length of the reinforcement element, not fixed to the tubular element.

6. The post according to claim 5, wherein, in a lateral cross-section, a gap between all external sides of the base portion and the tubular element does not exceed 4 mm.

7. The post according to claim 6, wherein a gap between the tubular element and the second side is larger than 4 mm, and a gap between the tubular element and remaining sides of the tapered portion does not exceed 4 mm.

8. The post according to claim 7, wherein the post presents, at the tapered portion, a symmetric cross-section, whereby the post comprises a symmetry plane with a normal in a lateral direction of the post, and the tapered portion is tapered as viewed along the normal of the symmetry plane.

9. The post according to claim 8, wherein the base portion extends laterally along the symmetry plane, from one end to another end of the tubular element cavity.

10. A structural frame for a cab of a vehicle, the structural frame comprising a post according to claim 1.

11. The structural frame according to claim 10, wherein the tapered portion of the reinforcement element of the post is located above the structure in the lower region of the cab.

12. A vehicle comprising a post according to claim 1.

13. The vehicle according to claim 12, wherein the post comprises, at the tapered portion of the reinforcement element, a symmetric cross-section, whereby the post comprises a symmetry plane with a normal in a lateral direction of the post, and the tapered portion of the reinforcement element is tapered as viewed along the normal of the symmetry plane, which symmetry plane is oriented so as to extend in parallel with a deformation direction which is a direction of a presumed major deformation in case of a roll-over incident of the vehicle.

14. The vehicle according to claim 13, wherein the deformation direction is parallel to a lateral direction of the vehicle.

15. The vehicle according to claim 13, wherein the deformation direction is parallel to a longitudinal direction of the vehicle.

16. The post according to claim 1, wherein in the base portion, the first side and the second side are straight and parallel.

17. A post for a cab of a vehicle, the post comprising:
a structure end adapted to be connected to a structure in a lower region of the cab,
a roof end adapted to be connected to a roof of the cab,
an elongated tubular element comprising a tubular element cavity extending longitudinally within the post, and
an elongated reinforcement element, the reinforcement element extending longitudinally in the longitudinal direction of the tubular element, along a part of the tubular element, and comprising a base end and a free end, a tapered portion of the reinforcement element including the free end thereof being located in the tubular element cavity and tapered in the direction from the base end towards the free end, the base end of the reinforcement element being, compared to the free end, located closer to the structure end of the post, wherein the post comprises, at the tapered portion, a symmetric cross-section, whereby the post comprises a symmetry plane with a normal in a lateral direction of the post, and the tapered portion is tapered as viewed along the normal of the symmetry plane;
wherein the reinforcement element comprises a first side extending straight in the longitudinal direction of the tubular element and a second side opposite the first side, the first side and the second side of the reinforcement element contacting respective inner surfaces of the tubular element, and a taper of the tapered portion being formed by the second side gradually becoming closer to the straight side in the tapered portion of the reinforcement element.

18. The post according to claim 17, wherein the tapered portion extends along the normal of the symmetry plane substantially from one end to another end of a cross-section of the tubular element cavity.

19. The post according to claim 18, wherein the tubular element comprises first and second inner surfaces located opposite to each other, wherein the tapered portion of the reinforcement element comprises a first part located at the first inner surface of the tubular element, and a second part located at the second inner surface, at least one reinforcement element cavity being formed between the first and second parts.

20. A post for a cab of a vehicle, comprising:
a structure end adapted to be connected to a structure in a lower region of the cab,
a roof end adapted to be connected to a roof of the cab,
an elongated tubular element comprising a tubular element cavity extending longitudinally within the post, and
an elongated reinforcement element, the reinforcement element extending longitudinally in the longitudinal direction of the tubular element, along a part of the tubular element, and comprising a base end and a free end, a tapered portion of the reinforcement element including the free end thereof being located in the tubular element cavity and tapered in the direction from the base end towards the free end, the base end of the reinforcement element forming the structure end of the post, or being, compared to the free end, located closer to the structure end of the post,
wherein the tubular element comprises first and second inner surfaces located opposite to each other, and
wherein the tapered portion of the reinforcement element comprises a first part located at the first inner surface of the tubular element, and a second part located at the second inner surface, at least one reinforcement element cavity being formed between the first and second parts;
wherein the reinforcement element comprises a core having a U-shaped cross-section; and
wherein the reinforcement element comprises a web extending between two flanges formed by the U-shaped cross-section of the core.

21. The post according to claim 20, wherein the post comprises, at the tapered portion, a symmetric cross-section, whereby the post comprises a symmetry plane with a normal in a lateral direction of the post, and the tapered portion is tapered as viewed along the normal of the symmetry plane, and the first and second parts of the reinforcement element are distributed on opposite sides of the symmetry plane.

22. The post according to claim 21, wherein the first and second parts are connected to each other by at least one connecting part.

23. The post according to claim 20, wherein the taper of the tapered portion of the reinforcement element is formed by two flanges, formed by the U-shaped cross-section of the core, being gradually shorter towards the free end of the reinforcement element.

24. The post according to claim 23, wherein the core is welded to the tubular element at three outer faces formed by the U-shaped cross-section.

25. The post according to claim 24, wherein the core and the tubular element present wall thicknesses which are substantially the same.

26. The post according to claim 25, wherein the core comprises a core base connecting the two flanges formed by the U-shaped cross-section of the core, and that the distance between the web and the core base is smaller towards the free end of the reinforcement element than towards the base end of the reinforcement element.

27. The post according to claim 26, wherein said reinforcement element is a first reinforcement element, the post further comprising a second elongated reinforcement element, the second reinforcement element extending longitudinally in the longitudinal direction of the tubular element, along a part of the tubular element, and presenting a base end and a free end, the free end of the second reinforcement element being located in the tubular element cavity and between the free end of the first reinforcement element and the roof end of the post, the base end of the second reinforcement element forming the roof end of the post, or being, compared to the free end of the second reinforcement element, located closer to the roof end of the post.

* * * * *